(12) United States Patent
Feng et al.

(10) Patent No.: US 10,809,363 B2
(45) Date of Patent: Oct. 20, 2020

(54) ANTI-INTERFERENCE RANGING METHOD AND APPARATUS

(71) Applicant: Benewake (Beijing) Co., Ltd., Beijing (CN)

(72) Inventors: Qiang Feng, Beijing (CN); Suo Lu, Beijing (CN); Xuxing Li, Beijing (CN); Lun Wo, Beijing (CN); Ying Zhang, Beijing (CN); Hao Liu, Beijing (CN); Qingshun Zhang, Beijing (CN); Kai Zheng, Beijing (CN); Da Shu, Beijing (CN); Yuan Li, Beijing (CN)

(73) Assignee: BENEWAKE (BEIJING) CO., LTD., Beijing (CN)

( * ) Notice: Subject to any disclaimer, the term of this patent is extended or adjusted under 35 U.S.C. 154(b) by 375 days.

(21) Appl. No.: 15/747,124

(22) PCT Filed: Nov. 30, 2017

(86) PCT No.: PCT/CN2017/113871
§ 371 (c)(1),
(2) Date: Jan. 23, 2018

(87) PCT Pub. No.: WO2019/104613
PCT Pub. Date: Jun. 6, 2019

(65) Prior Publication Data
US 2019/0162830 A1    May 30, 2019

(51) Int. Cl.
*G01C 3/08* (2006.01)
*G01S 7/495* (2006.01)
(Continued)

(52) U.S. Cl.
CPC ............ *G01S 7/495* (2013.01); *G01S 7/4804* (2013.01); *G01S 7/4863* (2013.01);
(Continued)

(58) Field of Classification Search
CPC ...... G01S 7/495; G01S 7/4863; G01S 7/4865; G01S 17/89; G01S 17/10
(Continued)

(56) References Cited

U.S. PATENT DOCUMENTS

2006/0131483 A1    6/2006  Schrey
2015/0373322 A1*  12/2015  Goma ................... G01S 7/483
                                                      348/21

FOREIGN PATENT DOCUMENTS

CN    104297760 A    1/2015
CN    104808214 A    7/2015
(Continued)

OTHER PUBLICATIONS

International Search Report for PCT/CN2017/113871 dated Aug. 27, 2018; 11 pages including English summary.

*Primary Examiner* — Mark Hellner
(74) *Attorney, Agent, or Firm* — Schwabe Williamson & Wyatt, PC

(57) ABSTRACT

An anti-interference ranging method and an anti-interference ranging apparatus are provided. The method includes: detecting, by a first light detection and ranging device, whether a light detection process is interfered by a second light detection and ranging device in the ranging system; delaying, by the first light detection and ranging device, the light detection process for a preset time period if it is detected that the light detection process is interfered by the second light detection and ranging device; and acquiring, by the first light detection and ranging device, detection data collected in the light detection process, and processing, by the first light detection and ranging device, the detection data to obtain a ranging result if it is detected that the light detection process is not interfered by the second light detection and ranging device.

12 Claims, 6 Drawing Sheets

(51) Int. Cl.
  *G01S 7/4863* (2020.01)
  *G01S 17/10* (2020.01)
  *G01S 17/89* (2020.01)
  *G01S 7/4865* (2020.01)
  *G01S 7/48* (2006.01)
  *G01S 17/08* (2006.01)
(52) U.S. Cl.
  CPC ............ *G01S 7/4865* (2013.01); *G01S 17/08* (2013.01); *G01S 17/10* (2013.01); *G01S 17/89* (2013.01)
(58) Field of Classification Search
  USPC ........................................................ 356/4.01
  See application file for complete search history.

(56) References Cited

FOREIGN PATENT DOCUMENTS

| | | |
|---|---|---|
| CN | 206311760 U | 7/2017 |
| CN | 207601310 U | 7/2018 |
| WO | 2004/086087 A1 | 10/2004 |

\* cited by examiner

ANTI-INTERFERENCE RANGING METHOD AND APPARATUS

CROSS-REFERENCE TO RELATED APPLICATION

This application is the national phase of International Application No. PCT/CN2017/113871, titled "ANTI-INTERFERENCE RANGING METHOD AND APPARATUS", filed on Nov. 30, 2017, which is incorporated herein by reference in its entirety.

FIELD

The present disclosure relates to the technical field of infrared ranging, and in particular to an anti-interference ranging method and an anti-interference ranging apparatus.

BACKGROUND

The ranging method based on light signal transmission is one of the most common ranging methods due to advantages of high detection speed, high detection accuracy, and the like. Taking the light detection and ranging technology as an example, a ranging process based on the light detection and ranging technology may include two operation processes, where a first operation process is a light detection process in which a laser in the light detection and ranging device emits detection light which is reflected by an obstacle when encountering the obstacle, and a photoelectric detector in the light detection and ranging device receives the reflected detection light and performs photoelectric conversion on the received light signal; and a second operation process is a data processing process in which a processor in the light detection and ranging device processes the electrical signal outputted from the photoelectric detector to obtain a distance between the light detection and ranging device and the obstacle.

In many application scenarios, multiple light detection and ranging devices operate simultaneously, in which case, however, the detection light emitted from light sources of different light detection and ranging devices may be interfered with each other, resulting in reduced ranging accuracy of the light detection and ranging device.

SUMMARY

In order to solve the technical issue, an anti-interference ranging method and an anti-interference ranging apparatus are provided according to the embodiments of the present disclosure to improve the accuracy of a light detection and ranging device.

Therefore, in a first aspect, an anti-interference ranging method is provided according to an embodiment of the present disclosure, where the method is applied to each of light detection and ranging devices in a ranging system, and includes:

detecting, by a first light detection and ranging device, whether a light detection process of the first light detection and ranging device is interfered by a second light detection and ranging device in the ranging system;

delaying, by the first light detection and ranging device, the light detection process for a preset time period if it is detected that the light detection process of the first light detection and ranging device is interfered by the second light detection and ranging device in the ranging system; and acquiring, by the first light detection and ranging device, detection data collected in the light detection process, and processing, by the first light detection and ranging device, the detection data to obtain a ranging result if it is detected that the light detection process of the first light detection and ranging device is not interfered by the second light detection and ranging device in the ranging system.

In some possible implementations, the detecting, by the first light detection and ranging device, whether the light detection process of the first light detection and ranging device is interfered by the second light detection and ranging device in the ranging system may include:

capturing, by the first light detection and ranging device, an environment image for characterizing information on an environment in which the first light detection and ranging device is located; and detecting, by the first light detection and ranging device based on the environment image, whether the light detection process is interfered by the second light detection and ranging device in the ranging system.

In some possible implementations, durations of light detection processes of the light detection and ranging devices in the ranging system may be the same, the environment image may include a first environment image for characterizing information on the environment in which the first light detection and ranging device is located at a first time instant before the light detection process, and a second environment image for characterizing information on the environment in which the first light detection and ranging device is located at a second time instant after the light detection process, and the detecting, by the first light detection and ranging device based on the environment image, whether the light detection process is interfered by the second light detection and ranging device in the ranging system may include:

acquiring, by the first light detection and ranging device based on the first environment image and the second environment image, a difference image for characterizing differences between grayscale values of the first environment image and grayscale values of the second environment image;

acquiring, by the first light detection and ranging device, a sum of absolute values of grayscale values of pixels in the difference image; and determining, by the first light detection and ranging device, that the light detection process is interfered by the second light detection and ranging device in the ranging system in a case where the sum of the absolute values of the grayscale values is greater than a preset first threshold.

In some possible implementations, the environment image may characterize information on the environment before the light detection process, and the detecting, by the first light detection and ranging device based on the environment image, whether the light detection process is interfered by the second light detection and ranging device in the ranging system may include:

acquiring, by the first light detection and ranging device, a gray value gradient of the environment image; and determining, by the first light detection and ranging device, that the light detection process is interfered by the second light detection and ranging device in the ranging system in a case where the gray value gradient is greater than a preset second threshold.

In some possible implementations, the detecting, by the first light detection and ranging device, whether the light detection process of the first light detection and ranging device is interfered by the second light detection and ranging device in the ranging system may include:

calculating, by the first light detection and ranging device, a standard deviation of differences between each set of detection data and standard data corresponding to the set of detection data, where the standard data corresponding to the set of detection data characterizes light intensity values acquired when there is interference; and determining, by the first light detection and ranging device, that the light detection process is interfered by the second light detection and ranging device in the ranging system in a case where a standard deviation of differences between at least one set of detection data and standard data corresponding to the set of detection data is greater than a preset third threshold.

In some possible implementations, the method may further include:

determining, by the first light detection and ranging device, that the light detection process is not interfered by the second light detection and ranging device in the ranging system in a case where a standard deviation of differences between each detection data and standard data corresponding to the detection data is not greater than the preset third threshold; and replacing, by the first light detection and ranging device with the detection data, the standard data corresponding to the detection data.

In some possible implementations, the delaying, by the first light detection and ranging device, the light detection process for a preset time period may include:

determining, by the first light detection and ranging device based on a time ratio, the preset time period to be N times of the duration of the light detection process, where the time ratio is a ratio of a duration of a data processing process to the duration of the light detection process of the first light detection and ranging device, and N is a positive integer not greater than the time ratio; and delaying, by the first light detection and ranging device, the light detection process for the preset time period.

In a second aspect, an anti-interference ranging apparatus is provided according to an embodiment of the present disclosure, where the apparatus is applied to each of light detection and ranging devices in a ranging system, and includes:

a detection module configured to detect whether a light detection process of a first light detection and ranging device is interfered by a second light detection and ranging device in the ranging system;

a delay module configured to delay the light detection process of the first light detection and ranging device for a preset time period if it is detected that the light detection process of the first light detection and ranging device is interfered by the second light detection and ranging device in the ranging system; and a data processing module configured to process detection data collected in the light detection process by the first light detection and ranging device to obtain a ranging result if it is detected that the light detection process of the first light detection and ranging device is not interfered by the second light detection and ranging device in the ranging system.

In some possible implementations, the detection module may include:

a capture unit configured to capture an environment image for characterizing information on an environment in which the first light detection and ranging device is located; and a detection unit configured to detect, based on the environment image, whether the light detection process is interfered by the second light detection and ranging device in the ranging system.

In some possible implementations, durations of light detection processes of the light detection and ranging devices in the ranging system may be the same, the environment image may include a first environment image for characterizing information on the environment in which the first light detection and ranging device is located at a first time instant before the light detection process, and a second environment image for characterizing information on the environment in which the first light detection and ranging device is located at a second time instant after the light detection process, and the detection unit may include:

a first acquisition subunit configured to acquire, based on the first environment image and the second environment image, a difference image for characterizing differences between grayscale values of the first environment image and grayscale values of the second environment image;

a second acquisition subunit configured to acquire a sum of absolute values of grayscale values of pixels in the difference image; and a first determination subunit configured to determine that the light detection process is interfered by the second light detection and ranging device in the ranging system in a case where the sum of the absolute values of the grayscale values is greater than a preset first threshold.

In some possible implementations, the environment image may characterize information on the environment before the light detection process, and the detection unit may include:

a third acquisition sub-unit configured to acquiring a gray value gradient of the environment image; and a second determination sub-unit configured to determine that the light detection process is interfered by the second light detection and ranging device in the ranging system in a case where the gray value gradient is greater than a preset second threshold.

In some possible implementations, the detection unit may include:

a calculation unit configured to calculate a standard deviation of differences between each set of detection data and standard data corresponding to the set of detection data, where the standard data corresponding to the set of detection data characterizes light intensity values acquired when there is no interference; and a first determination unit configured to determine that the light detection process is interfered by the second light detection and ranging device in the ranging system in a case where a standard deviation of differences between at least one set of detection data and standard data corresponding to the set of detection data is greater than a preset third threshold.

In some possible implementations, the apparatus may further include:

a determination module configured to determine that the light detection process is not interfered by the second light detection and ranging device in the ranging system in a case where a standard deviation of differences between each detection data and standard data corresponding to the detection data is not greater than the preset third threshold; and a replacement module configured to replace, with the detection data, the standard data corresponding to the detection data.

In some possible implementations, the delay module may include:

a second determination unit configured to determine, based on a time ratio, the preset time period to be N times of the duration of the light detection process, where the time ratio is a ratio of a duration of a data processing process to the duration of the light detection process of the first light detection and ranging device, and N is a positive integer not greater than the time ratio; and a delay unit configured to cause the first light detection and ranging device to delay the light detection process for the preset time period.

As can be seen from the above technical solution, the embodiments of the present disclosure have the following advantages.

In the ranging system, for each of light detection and ranging devices in the ranging system, it is detected whether a light detection process of the light detection and ranging device is interfered by other light detection and ranging devices in the ranging system, and the light detection process is delayed for a preset time period if it is detected that the light detection process is interfered by other light detection and ranging devices. If it is detected that the light detection process is not interfered by other light detection and ranging devices, the light detection and ranging device acquires detection data collected in the light detection process and processes the detection data to obtain a ranging result. As can be seen from the above, for each of light detection and ranging devices in the ranging system, if it is detected that the light detection process is interfered by other light detection and ranging devices, which indicates that another light detection and ranging device also performs a light detection process when the light detection and ranging device performs the light detection process, detection light of the light detection and ranging device may be interfered by detection light of the other light detection and ranging device in the light detection process, which results in inaccurate detection data collected by the light detection and ranging device in the light detection process. In this case, the light detection and ranging device does not process the inaccurate detection data collected in the light detection process to obtain the ranging result, but delays the light detection process for a preset time period. The method is performed until the light detection process of the light detection and ranging device is not affected by the light detection process of other light detection and ranging devices, thereby ensuring the accuracy of the detection data collected by the light detection and ranging device in the light detection process, thus the ranging accuracy of the light detection and ranging device is improved.

BRIEF DESCRIPTION OF THE DRAWINGS

In order to more clearly illustrate embodiments of the present disclosure or technical solutions in the conventional technology, the drawings, which are to be used in the description of the embodiments or the conventional technology, are briefly described. It is apparent that, the drawings in the following description show only some embodiments of the present disclosure, and other drawings may be obtained by those skilled in the art from the drawings without creative efforts.

DETAILED DESCRIPTION OF EMBODIMENTS

In order to provide a solution for improving ranging accuracy of a light detection and ranging (LiDAR) device, an anti-interference ranging method and an anti-interference ranging apparatus are provided according to the embodiments of the present disclosure. The embodiments of the present disclosure are described below in conjunction with the drawings. It should be understood that the embodiments described herein are only for the purpose of describing and explaining the present disclosure, rather than limiting the present disclosure. In addition, the embodiments of the present disclosure and features in the embodiments can be combined with each other as long as no conflict occurs.

Figure 1:
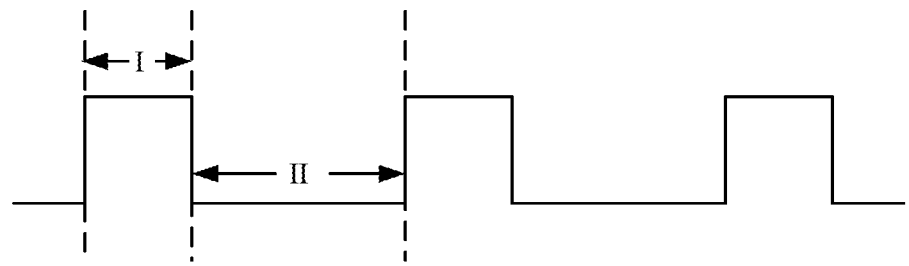
FIG. 1 is a timing diagram of a ranging process of each of the light detection and ranging devices in a ranging system.

Reference is made to FIG. 1, which shows a timing diagram of a ranging process of each of light detection and ranging devices in a ranging system. A ranging period may include a light detection process I and a data processing process II. An implementation of the ranging process of the light detection and ranging device is described as follows. First, in the light detection process I, the light detection and ranging device emits detection light (a light source of the detection light is a laser light source or an LED light source.) which is modulated by a modulation signal source, receives the detection light which is reflected by an obstacle when encountering the obstacle, and samples the detection light to acquire detection data. Next, in the data processing process II, the light detection and ranging device processes the detection data acquired by sampling in the light detection process, to obtain a distance between the light detection and ranging device and the obstacle.

Figure 2:
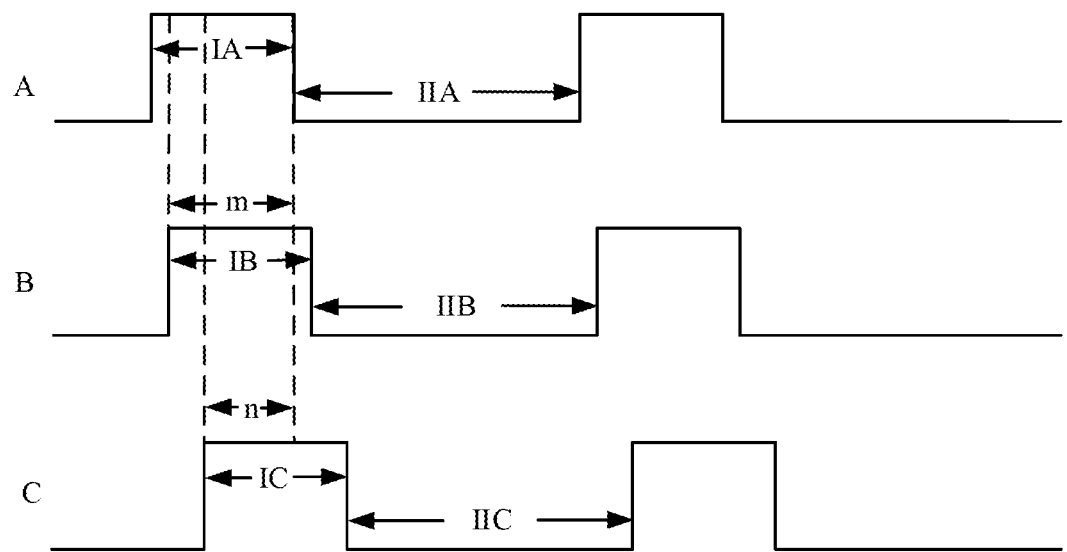
FIG. 2 is a timing diagram of ranging processes simultaneously performed by light detection and ranging devices A, B, and C.

Based on study, the applicant found that, in a case where a ranging system includes multiple light detection and ranging devices, a light detection process of each of the multiple light detection and ranging devices may be interfered by light detection processes of other light detection and ranging devices. A case where a ranging system includes three light detection and ranging devices A, B and C is taken as an example. Reference is made to FIG. 2, which shows a timing diagram of ranging processes performed by three light detection and ranging devices A, B, and C. As can be seen from FIG. 2, a light detection process IA of the light detection and ranging device A overlaps with a light detection process IB of the light detection and ranging device B during an overlap time period m in a case where the light detection and ranging devices A, B, and C simultaneously perform ranging. During the overlap time period m, the light detection process IA of the light detection and ranging device A may be interfered by detection light emitted from the light detection and ranging device B in the light detection process IB, that is, the reflected detection light to be sampled by the light detection and ranging device A in the light detection process IA may include the interfering detection light emitted from the light detection and ranging device B. The interfering detection light may be emitted from the light detection and ranging device B directly toward the light detection and ranging device A, or may be directed to the light detection and ranging device A after being reflected by an obstacle.

Likewise, since the light detection process IA of the light detection and ranging device A overlaps with a light detection process IC of the light detection and ranging device C during an overlap time period n, the light detection process IA of the light detection and ranging device A may also be interfered by the detection light emitted from the light detection and ranging device C during the overlap time period n. That is, in a case where the light detection processes of the light detection and ranging devices A, B, and C overlap with each other during a time period, the light detection processes of the light detection and ranging devices A, B, and C may be interfered with each other. In other words, the light detection process IA of the light detection and ranging device A may be interfered by the light detection processes of the light detection and ranging devices B and C. Likewise, the light detection process IB of the light detection and ranging device B may be interfered by the light detection processes of the light detection and ranging devices A and C. Likewise, the light detection process IC of the light detection and ranging device C may be interfered by the light detection processes of the light detection and ranging devices A and B.

It should be understood that, for each light detection and ranging device, if the light detection process is interfered by detection light of other light detection and ranging devices, the light detection and ranging device samples the interfered detection light, and inaccurate detection data can be acquired. Therefore, the distance between the light detection and ranging device and an obstacle acquired based on the detection data is inaccurate, resulting in reduced ranging accuracy of the light detection and ranging device.

Figure 3:
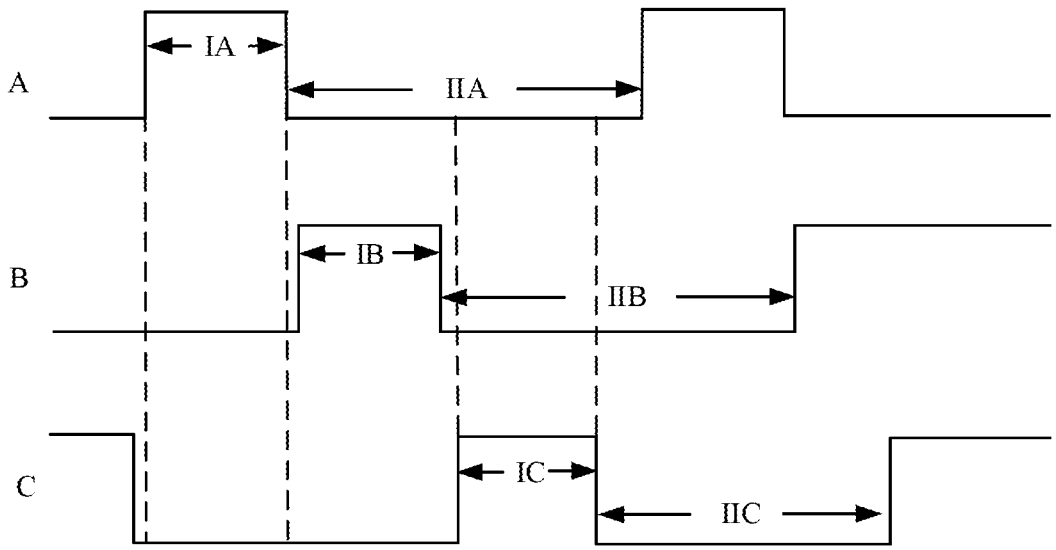
FIG. 3 is a timing diagram of ranging processes of light detection and ranging devices A, B, and C on which anti-interference is performed.

In order to improve the ranging accuracy of the light detection and ranging device, an anti-interference ranging method is provided according to an embodiment of the present disclosure. With the method, a light detection process of each of light detection and ranging devices in a ranging system is not affected by light detection processes of other light detection and ranging devices, thus the ranging accuracy of the light detection and ranging device can be improved. Specifically, the three light detection and ranging devices A, B, and C are still taken as an example. For each of the three light detection and ranging devices, it is detected whether the light detection process is interfered by other light detection and ranging devices in the ranging system. If it is detected that the light detection process of the light detection and ranging device is interfered by other light detection and ranging devices, the light detection and ranging device delays the light detection process for a preset time period, so that the light detection process of the light detection and ranging device is not affected by light detection processes of other light detection and ranging devices. As shown in FIG. 3, light detection processes of the light detection and ranging devices A, B, and C do not overlap with each other. In this case, when each of the light detection and ranging devices performs the light detection process, other light detection and ranging devices do not perform the light detection processes. Therefore, the light detection process of the light detection and ranging device is not interfered by detection light of other light detection and ranging devices, and the detection light sampled by the light detection and ranging device does not include the interfering light, thus the acquired detection data is accurate, and the acquired distance between the light detection and ranging device and the obstacle is accurate and reliable.

On the other hand, if it is detected that the light detection process of the light detection and ranging device is not interfered by other light detection and ranging devices, which indicates that other light detection and ranging devices do not perform the light detection processes when the light detection and ranging device performs the light detection process, the light detection and ranging device acquires detection data collected in the light detection process and processes the detection data to obtain a ranging result. Since the light detection process of the light detection and ranging device is not interfered by other light detection and ranging devices, the distance between the LiDAR and the obstacle acquired by the light detection and ranging device is accurate and reliable.

As an example, the embodiment of the present disclosure may be applied to an application scenario of multiple unmanned vehicles or multiple automated guided vehicles. In this application scenario, each of the unmanned vehicles or automated guided vehicles is provided with a light detection and ranging device for detecting the environment. In order to avoid mutual interferences between the light detection processes of multiple light detection and ranging devices, each of the light detection and ranging devices detects whether the light detection process thereof is interfered by other light detection and ranging devices. If it is detected that the light detection process of the light detection and ranging device is interfered by other light detection and ranging devices, the light detection and ranging device delays the light detection process for a preset time period. If it is detected that the light detection process of the light detection and ranging device is not interfered by other light detection and ranging devices, the light detection and ranging device acquires detection data collected in the light detection process and processes the collected detection data to obtain a ranging result.

Various non-limiting implementations of an anti-interference ranging method and an anti-interference ranging apparatus according to the embodiments of the present disclosure are described below in detail with embodiments in conjunction with the drawings.

Figure 4:
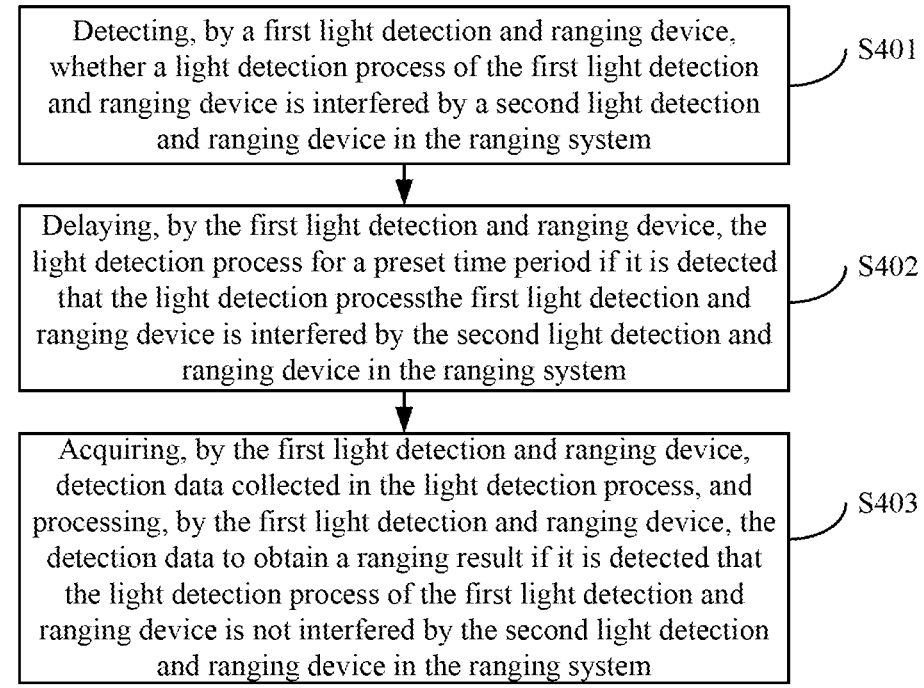
FIG. 4 is a flowchart of an anti-interference ranging method according to an embodiment of the present disclosure.

Reference is made to FIG. 4, which shows a flowchart of an anti-interference ranging method according to an embodiment of the present disclosure. In this embodiment, a case where a detection system includes two light detection and ranging devices (a first light detection and ranging device and a second light detection and ranging device) is taken as an example for description. The method may include following steps S401 to S403.

In S401, the first light detection and ranging device detects whether a light detection process of the first light detection and ranging device is interfered by the second light detection and ranging device in the ranging system.

The ranging system includes at least the first light detection and ranging device which performs ranging. It should be understood that, in a case where only one light detection and ranging device in the ranging system performs ranging, the light detection process of the light detection and ranging device is not interfered by other light detection and ranging devices.

In a case where at least the first light detection and ranging device and the second light detection and ranging device in the ranging system perform ranging, the light detection process of the first light detection and ranging device may be interfered by the second light detection and ranging device, and the light detection process of the second light detection and ranging device may also be interfered by the first light detection and ranging device if the light detection process of the first light detection and ranging device overlaps with a light detection process of the second light detection and ranging device during an overlap time period.

Figure 5A:
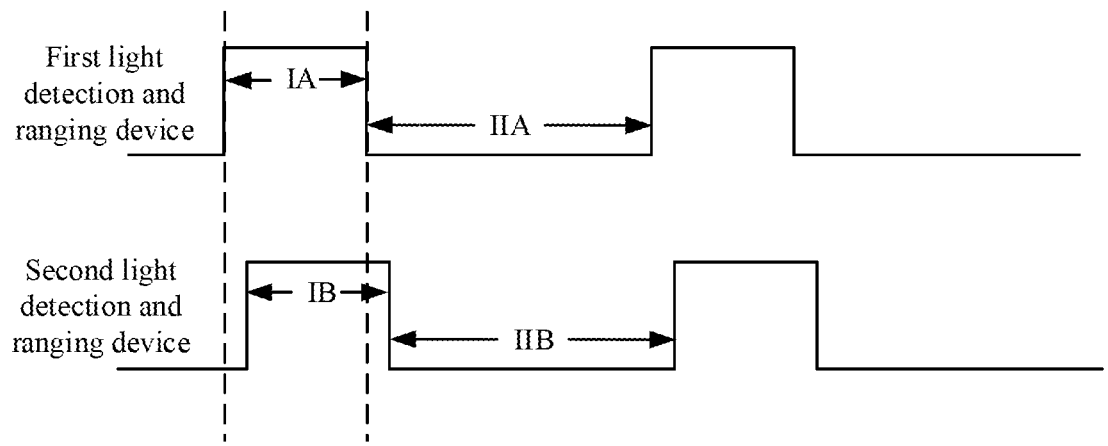
FIG. 5a is a timing diagram of light detection processes of a first light detection and ranging device and a second light detection and ranging device which are interfered with each other according to an embodiment of the present disclosure.
Figure 5B:
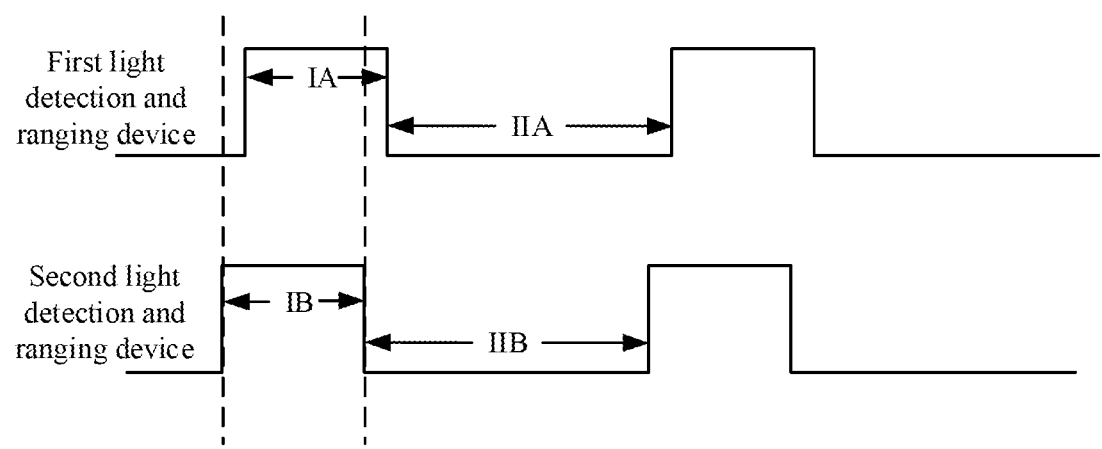
FIG. 5b is a timing diagram of light detection processes of a first light detection and ranging device and a second light detection and ranging device which are interfered with each other according to an embodiment of the present disclosure.
Figure 5C:
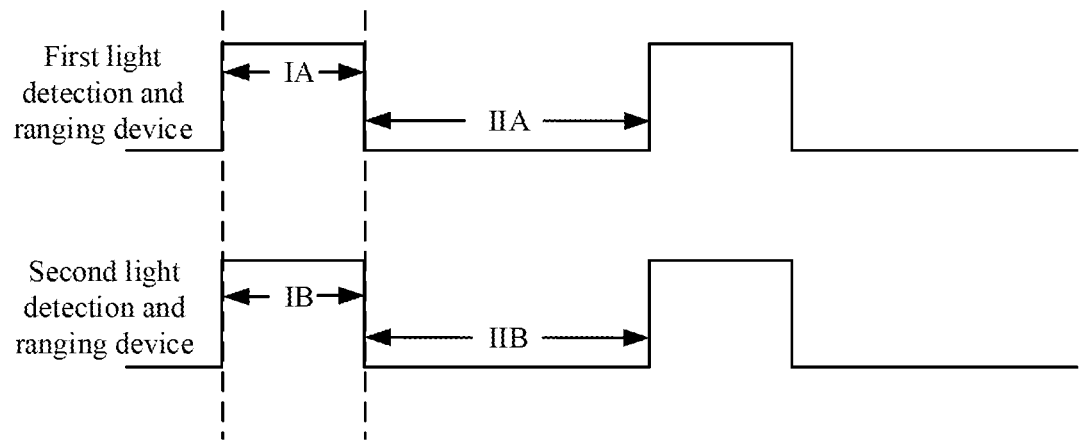
FIG. 5c is a timing diagram of light detection processes of a first light detection and ranging device and a second light detection and ranging device which are interfered with each other according to an embodiment of the present disclosure.

Specifically, as shown in FIG. 5a, the first light detection and ranging device performs the light detection process, and the second light detection and ranging device performs the light detection process when the first light detection and ranging device first performs the light detection process for a time period. In this case, the light detection process of the first light detection and ranging device is affected by the light detection process of the second light detection and ranging device, and the light detection process of the second light detection and ranging device is also affected by the light detection process of the first light detection and ranging device. As shown in FIG. 5b, the second light detection and ranging device first performs the light detection process, and the first light detection and ranging device performs the light detection process when the second light detection and ranging device performs the light detection process for a time period. In this case, the light detection process of the first light detection and ranging device is also affected by the light detection process of the second light detection and ranging device. As shown in FIG. 5c, the first light detection and ranging device and the second light detection and ranging device simultaneously perform light detection processes, and the light detection processes of the first light detection and ranging device and the second light detection and ranging device are interfered with each other.

In S402, the first light detection and ranging device delays the light detection process for a preset time period if it is detected that the light detection process of the first light detection and ranging device is interfered by the second light detection and ranging device in the ranging system.

If it is detected that the light detection process of the first light detection and ranging device is interfered by the second light detection and ranging device, which indicates that the second light detection and ranging device also performs a light detection process when the first light detection and ranging device performs the light detection process, the light detection process of the first light detection and ranging device overlaps with the light detection process of the second light detection and ranging device during a time period. As shown in FIG. 2, the light detection process of the light detection and ranging device A overlaps with the light detection process of the light detection and ranging device B during an overlap time period m.

In order to avoid the light detection process of the first light detection and ranging device being interfered by the second light detection and ranging device, the first light detection and ranging device delays the light detection process for a preset time period, so that the light detection process of the first light detection and ranging device and the light detection process of the second light detection and ranging device can be staggered. In this case, the second light detection and ranging device does not perform the light detection process when the first light detection and ranging device performs the light detection process, so that the light detection process of the first light detection and ranging device is not interfered by the light detection process of the second light detection and ranging device, and the light detection process of the second light detection and ranging device is not interfered by the light detection process of the first light detection and ranging device.

It should be understood that a ranging process of a light detection and ranging device includes a light detection process and a data processing process, and only the light detection process may be interfered by other light detection and ranging devices. In the data processing process, the light detection and ranging device does not emit or receive detection light, but performs data processing on the received detection light which is reflected by an obstacle, to obtain a distance between the LiDAR and the obstacle. Therefore, the light detection process of the first light detection and ranging device may be staggered with the light detection process of the second light detection and ranging device. In other words, the second light detection and ranging device performs the data processing process when the first light detection and ranging device performs the light detection process, and the second light detection and ranging device performs the light detection process when the first light detection and ranging device performs the data processing process, so that optical disturbance during the light detection processes of the first light detection and ranging device and the second light detection and ranging device is avoided.

As an exemplary implementation, the first light detection and ranging device delaying the light detection process for the preset time period may include following steps a and b.

In step a, the first light detection and ranging device determines the preset time period to be N times of the duration of the light detection process based on a time ratio, where the time ratio is a ratio of a duration of the data processing process to a duration of the light detection process of the first light detection and ranging device, and N is a positive integer not greater than the time ratio.

In step b, the first light detection and ranging device delays the light detection process for the preset time period.

The duration of the data processing process of the light detection and ranging device is generally not less than the duration of the light detection process of the light detection and ranging device. If the data processing process of the light detection and ranging device is complex, the duration of the data processing process of the light detection and ranging device performs is much greater than the duration the light detection process. Therefore, when the time period for delay is determined, the duration of the light detection process may be used as a unit, and the light detection process may be delayed for N times of the duration of the light detection process, where N is a positive integer, and the N times of the duration of the light detection process does not exceed the duration of the data processing process. That is, N is a positive integer which is not greater than the time ratio of the data processing process to the light detection process.

The light detection process of the first light detection and ranging device is delayed for N times of the duration of the light detection process, so that the second light detection and ranging device performs the data processing process when the first light detection and ranging device performs the light detection process, thus the light detection process of the first light detection and ranging device is not interfered by the second light detection and ranging device. It should be understood that, in a case where the first light detection and ranging device detects that the light detection process is interfered, and delays the light detection process for the preset time period, the delayed light detection process of the first light detection and ranging device may still overlaps with the light detection process of the second light detection and ranging device during a time period, that is, the light detection process of the first light detection and ranging device may still be interfered. In this case, if the first light detection and ranging device detects that the light detection process is still interfered, the first light detection and ranging device needs to delay the light detection process for a preset time period. The above process is repeated, and the first light detection and ranging device delays the light detection process until the first light detection and ranging device detects that the light detection process is not interfered, during which the first light detection and ranging device delays the light detection process for a same preset time period or different preset time periods.

It is to be noted that, each time when the light detection process is delayed for the preset time period, N may be and positive integer in an interval of [1, the time ratio]. Since the light detection process of the first light detection and ranging device may be delayed for multiple number of times, in a case where the first light detection and ranging device randomly selects a positive integer from the interval of [1, the time ratio] as N, preset time periods for which the light detection process is delayed for multiple number of times may be the same or different from each other, which is not limited herein. In a case where the first light detection and ranging device detects the interference from the second light detection and ranging device, and the second light detection and ranging device also detects the interference from the first light detection and ranging device, both the light detection process of the first light detection and ranging device and the light detection process of the second light detection and ranging device are to be delayed separately.

Figure 6A:
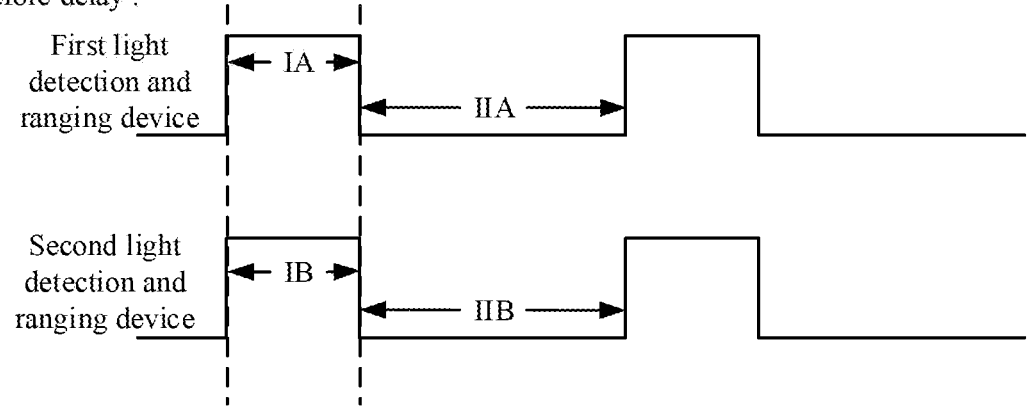
FIG. 6a is a timing diagram of ranging processes of a first light detection and ranging device and a second light detection and ranging device before delay is applied according to an embodiment of the present disclosure.
Figure 6B:
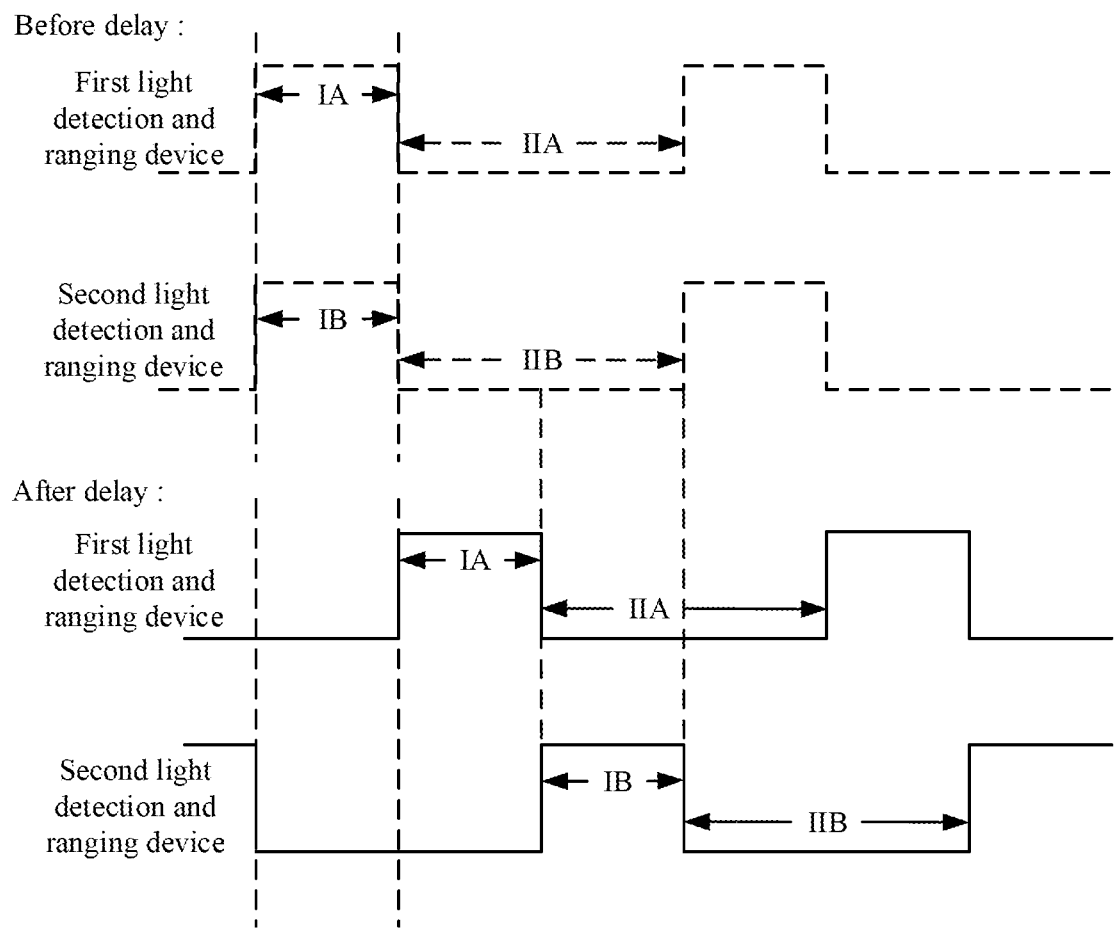
FIG. 6b is a timing diagram of ranging processes of a first light detection and ranging device and a second light detection and ranging device after delay is applied according to an embodiment of the present disclosure.

For example, as shown in FIGS. 6a and 6b, the case where the first light detection and ranging device and the second light detection and ranging device in the ranging system simultaneously perform the light detection processes is described as an example. It is assumed that, the duration of the light detection process of the first light detection and ranging device is the same as that of the second light detection and ranging device, the duration the data processing process of the first light detection and ranging device is the same as that of the second light detection and ranging device, and the duration of the data processing process is two times of the duration of the light detection process, that is, the time ratio is 2. As shown in FIG. 6a, in a case where the first light detection and ranging device detects that the light detection process is interfered by the second light detection and ranging device, the light detection process of the first light detection and ranging device may be delayed for one time of the duration of the light detection process. In addition, the second light detection and ranging device also detects that the light detection process is interfered by the first light detection and ranging device, and the light detection process of the second light detection and ranging device may be delayed for two times of the duration of the light detection process, so that the second light detection and ranging device performs the data processing process when the first light detection and ranging device performs the light detection process, as shown in FIG. 6b. Therefore, the light detection process of the first light detection and ranging device is not interfered by the second light detection and ranging device.

Of course, the light detection process of the first light detection and ranging device may be delayed for two times of the duration of the light detection process, and the light detection process of the second light detection and ranging device may be delayed for one time of the duration of the light detection process. The specific implementation thereof is similar to the above implementation, and is not repeated herein.

In S403, if it is detected that the light detection process of the first light detection and ranging device is not interfered by the second light detection and ranging device in the ranging system, the first light detection and ranging device acquires detection data collected in the light detection process and processes the detection data to obtain a ranging result.

If it is detected that the light detection process of the first light detection and ranging device is not interfered by the second light detection and ranging device, which indicates that the second light detection and ranging device does not perform the light detection process when the first light detection and ranging device performs the light detection process, the collected detection data is accurate. In this case, the first light detection and ranging device processes the detection data in the data processing process to obtain the distance between the first light detection and ranging device and the obstacle. Since the detection data is accurate, the distance result obtained by the first light detection and ranging device is also accurate.

It is to be noted that light detection and ranging devices in a ranging system perform ranging independently from each other. That is, whether each of the light detection and ranging devices performs ranging is controlled by the light detection and ranging device itself and independently from other light detection and ranging devices, and the light detection and ranging device does not control other light detection and ranging devices in the ranging system to perform ranging. In addition, only in the case where at least two light detection and ranging devices in the ranging system simultaneously perform ranging, the light detection processes of the light detection devices may be interfered with each other. Therefore, the anti-interference ranging method is applicable to each light detection device in the ranging system. That is, when each light detection device performs ranging, the light detection device detects whether the light detection process of the light detection and ranging device is interfered by light detection processes of other light detection and ranging devices, and the light detection process of the light detection and ranging device is delayed for a preset time period if it is detected that the light detection process of the light detection and ranging device is interfered by the light detection processes of other light detection and ranging devices. Further, after the light detection process is delayed for the preset time period, the light detection device continues to detect whether the light detection process is still interfered by the light detection processes of other light detection and ranging devices. The above steps are repeated until the light detection process of the light detection and ranging device is not interfered by the light detection processes of other light detection and ranging devices. In addition, in a case where only one light detection and ranging device in the ranging system performs ranging, the light detection and ranging device is not interfered by other light detection and ranging devices in the ranging system which do not perform ranging. However, since the light detection and ranging device is not informed that other light detection and ranging devices do not perform ranging, the anti-interference ranging method according to the present disclosure is also adopted, and the step of detecting whether there are interferences from other light detection and ranging devices is performed.

According to this embodiment, in the ranging system including at least the first light detection and ranging device and the second light detection and ranging device, the first light detection and ranging device detects whether the light detection process is interfered by the second light detection and ranging device, and delays the light detection process for a preset time period in a case of detecting that the light detection process is interfered by the second light detection and ranging device. In addition, in a case of detecting that the light detection process is not interfered by the second light detection and ranging device, the first light detection and ranging device acquires detection data collected in the light detection process and processes the detection data to obtain the ranging result.

As can be seen, in a case where the first light detection and ranging device detects that the light detection process is interfered by other light detection and ranging devices, the second light detection and ranging device also performs the light detection process when the first light detection and ranging device performs the light detection process, and detection light of the first light detection and ranging device is interfered by detection light of the second light detection and ranging device in the light detection process. Therefore, detection data collected by the first light detection and ranging device in the light detection process is inaccurate. In this case, the first light detection and ranging device does not process the inaccurate detection data collected in the light detection process to obtain the ranging result, but delays the light detection process for a preset time period. The method is repeated until the light detection process of the first light detection and ranging device is not affected by the light detection process of the second light detection and ranging device, thereby ensuring the accuracy of the detection data collected by the first light detection and ranging device in the light detection process, thus the ranging accuracy of the first light detection and ranging device can be improved.

It is to be noted that, in the above embodiment, the first light detection and ranging device and the second light detection and ranging device in the ranging system are taken as an example for description, and the ranging system may further include other light detection and ranging devices, such as a third light detection and ranging device. In a case where the ranging system includes three or more light detection and ranging devices, the anti-interference method for the first light detection and ranging device is similar to that described in the above embodiment. In a case of detecting that the light detection process is interfered by the second light detection and ranging device and/or the third light detection and ranging device, the first light detection and ranging device delays the light detection process for a preset time period. The first light detection and ranging device acquires a distance between the first light detection and ranging device and an obstacle based on detection data collected in the light detection process when the light detection process of the first light detection and ranging device is not interfered by the second light detection and ranging device and the third light detection and ranging device. For each of the second light detection and ranging device, the third light detection and ranging device and other light detection and ranging devices in the detection system, the method is adopted to avoid interference to the detection light, so that sampling is performed on the detection light which is not interfered, thereby acquiring accurate detection data and an accurate ranging result. In addition, a sum of durations of light detection processes of the light detection and ranging devices in the detection system is not greater than the minimum ranging cycle of the light detection and ranging devices.

Furthermore, in order to illustrate the technical solution of the present disclosure in detail, according to the embodiments of the present disclosure, there are further provided several implementations of the first light detection and ranging device detecting whether the light detection process is interfered by the second light detection and ranging device.

According to a first implementation of interference detection, whether the light detection process is interfered is determined based on environment images before and after the light detection process. The implementation may include the following steps A and B.

In step A, the first light detection and ranging device captures an environment image for characterizing information on environment in which the first light detection and ranging device is located.

In step B, the first light detection and ranging device detects, based on the environment image, whether the light detection process is interfered by the second light detection and ranging device in the ranging system.

It should be noted that, the information on the environment in which the first light detection and ranging device is located before and after the light detection process may reflect whether the light detection process of the first light detection and ranging device is affected by the second light detection and ranging device. In one aspect, whether the light detection process of the first light detection and ranging device is interfered by the second light detection and ranging device may be determined based on a first environment image before the light detection process of the first light detection and ranging device and a second environment image after the light detection process of the first light detection and ranging device. In another aspect, whether the light detection process of the first light detection and ranging device is interfered by the second light detection and ranging device may be determined based on only the environment image before the light detection process of the first light detection and ranging device. The two manners are respectively described below in detail.

As an exemplary implementation, a duration of the light detection process of the first light detection and ranging device is the same as a duration of the light detection process of the second light detection and ranging device in the ranging system. The first light detection and ranging device captures a first environment image for characterizing information on an environment in which the first light detection and ranging device is located at a first time instant, i.e., information on the environment in which the first light detection and ranging device is located before the light detection process of the first light detection and ranging device. The first light detection and ranging device captures a second environment image for characterizing information on an environment in which the first light detection and ranging device is located at a second instant, i.e., information on the environment in which the first light detection and ranging device is located after the light detection process of the first light detection and ranging device. In this case, the detecting, based on the first environment image and the second environment image, whether the light detection process is interfered by the second light detection and ranging device may include the following steps A1 to C1.

In step A1, the first light detection and ranging device acquires a difference image based on the first environment image and the second environment image. The difference image characterizes differences between grayscale values of the first environment image and grayscale values of the second environment image.

In step B1, the first light detection and ranging device acquires a sum of absolute values of grayscale values of pixels in the difference image.

In step C1, in a case where the sum of the absolute values of the grayscale values of the pixels in the difference image is greater than a preset first threshold, the first light detection and ranging device determines that the light detection process is interfered by the second light detection and ranging device in the ranging system.

It should be understood that, the duration of the light detection process of the first light detection and ranging device is the same as the duration of the light detection process of the second light detection and ranging device, and the duration of the light detection process is generally short. Therefore, if the light detection process of the first light detection and ranging device is not interfered by the second light detection and ranging device, the difference between the first environment image and the second environment image is generally insignificant. In addition, if the light detection process of the first light detection and ranging device is interfered by the second light detection and ranging device, the difference between the first environment image and the second environment image is significant, and a sum of absolute values of grayscale values of pixels in the difference image acquired based on the first environment image and the second environment image may also be great. In a case where the sum of the absolute values of the grayscale values of pixels in the difference image is greater than the preset first threshold, which indicates that the difference between the first environment image and the second environment image exceeds an allowable range, it may be considered that the light detection process of the first light detection and ranging device is interfered by the second light detection and ranging device.

The preset first threshold may be preset by a technician or may be automatically generated by an algorithm or a program. The preset first threshold may be set in several manners, which are not described herein.

As another exemplary implementation, the first light detection and ranging device captures only an environment image before the light detection process. The environment image characterizes information on environment before the light detection process. In this case, the detecting, based on the environment image, whether the light detection process is interfered by the second light detection and ranging device may include the following steps A2 to B2.

In step A2, the first light detection and ranging device acquires a gray value gradient of the environment image.

In step B2, in a case where the gray value gradient is greater than a preset second threshold, the first light detection and ranging device determines that the light detection process is interfered by the second light detection and ranging device in the ranging system.

An image may be considered as a two dimensional discrete function, and a gray value gradient of the image is derivation of the two dimensional discrete function. That is, the gray value gradient reflects a change rate of grayscale values of pixels in the environment image in a specified direction. Specifically, for each pixel in the environment image, a rate of change between a grayscale value of the pixel and a grayscale value of an adjacent pixel in one or more directions may be calculated, and the gray value gradient of the environment image may be acquired.

It should be understood that, if the light detection process of the first light detection and ranging device is not interfered by the second light detection and ranging device, the gray value gradient of the environment image before the light detection process has an insignificant change or has no change. In addition, in a case where the gray value gradient of the environment image is greater than the preset second threshold, which indicates that grayscale values of some pixels in the environment image change abnormally and abruptly, it is indicated that the second light detection and ranging device performs the light detection process, which causes interference to the light detection process of the first light detection and ranging device, that is, the light detection process of the first light detection and ranging device is interfered by the second light detection and ranging device. In this case, the first light detection and ranging device does not perform the light detection process, and delays the light detection process to avoid the interference. Therefore, the first light detection and ranging device does not perform the light detection process, and does not cause interference to the light detection process performed by the second light detection and ranging device.

The gray value gradient may be a Roberts gradient, a Sobel gradient, a Prewitt gradient, a Laplacian gradient, or the like. The gray value gradient may be acquired in several manners, which are not described herein.

The preset second threshold may be preset by a technician or may be automatically generated by an algorithm or a program. The preset second threshold may be set in several manners, which are not described herein.

By comparing the two implementations of detecting whether the light detection process is interfered by the second light detection and ranging device in the ranging system based on the environment image, the following conclusion can be drawn.

In the first implementation, the first light detection and ranging device is required to compare the first environment image captured before the light detection process with the second environment image captured after the light detection process after the light detection process is performed, to determine whether interference occurs. In this case, if the first light detection and ranging device is interfered by the second light detection and ranging device, detection data collected by the first light detection and ranging device in the light detection process is inaccurate. Similarly, the second light detection and ranging device is affected by the first light detection and ranging device, and detection data collected by the second light detection and ranging device in the light detection process is also inaccurate.

In the second implementation, the first light detection and ranging device acquires the environment image and the gray value gradient of the environment image, and determines, based on the gray value gradient of the environment image, whether the first light detection and ranging device is interfered by the second light detection and ranging device before the light detection process is performed. If the first light detection and ranging device is interfered by the second light detection and ranging device, the light detection process of the first light detection and ranging device is interfered. In this case, the first light detection and ranging 30) device does not perform the light detection process, but directly delay the light detection process. Therefore, the second light detection and ranging device is not affected by the first light detection and ranging device, and detection data collected by the second light detection and ranging device in the light detection process is accurate.

That is, in the second implementation, once the condition for the first light detection and ranging device to perform the light detection process is met, i.e., the gray value gradient of the environment image is not greater than the preset second threshold, the light detection process of the first light detection and ranging device is not interfered by other light detection and ranging devices. In other words, if other light detection and ranging devices detect the interference, they do not perform the light detection processes. Therefore, as compared with the first implementation, anti-interference ranging can be implemented in a convenient and rapid manner with the second implementation.

The above exemplary implementation of interference detection is applicable to various implementations of acquiring a ranging result based on detection data collected in a light detection process. As an example, an exemplary implementation of acquiring a ranging result based on detection data collected in a light detection process is provided according to this embodiment. The exemplary implementation includes: during the light detection process, the first light detection and ranging device samples the received detection light which is reflected by an obstacle. Assuming that four samplings are performed in the light detection process, four detection pixel arrays are acquired as detection data, four sampling signal values D0, D1, D2 and D3 are acquired based on the detection data, and the first light detection and ranging device processes the sampling signal values D0, D1, D2 and D3 using the following equation (1) to obtain a distance between the first light detection and ranging device and the obstacle:

$$D = \frac{1}{2} \frac{C}{2\pi f} \arctan\left(\frac{D0 - D2}{D1 - D3}\right) \quad (1)$$

In the above equation, D represents a distance between the first light detection and ranging device and the obstacle, C represents a propagation speed of light in vacuum, f represents a frequency of detection light which is modulated by a modulation signal source, and D0, D1, D2 and D3 represent sampling signal values respectively acquired in four signal samplings.

It is to be noted that the implementation of acquiring the ranging result is only an example for illustrating acquiring the ranging result based on detection data, and is not intended to limit the present disclosure. In practical applications, two samplings may be performed on the received detection light, which is not limited herein.

In the case of acquiring the distance between the first light detection and ranging device and the obstacle using the method in the above implementation, a second implementation for interference detection is further provided, where determination is performed based on the detection data acquired in the light detection process of the first light detection and ranging device. Specifically, this implementation may include the following steps I to II.

In step I, the first light detection and ranging device calculates a standard deviation of differences between each set of detection data and standard data corresponding to the set of detection data. The standard data corresponding to the set of detection data characterizes light intensity values acquired when there is no interference.

In step II, in a case where a standard deviation of differences between at least one set of detection data and standard data corresponding to the set of detection data is greater than a preset third threshold, the first light detection and ranging device determines that the light detection process is interfered by the second light detection and ranging device in the ranging system.

If the light detection process of the first light detection and ranging device is not interfered by the second light detection and ranging device, there is generally no difference or only small differences between sets of detection data acquired by the first light detection and ranging device sampling detection light which is reflected by an obstacle, and corresponding standard data. However, if the light detection process of the first light detection and ranging device is interfered by the second light detection and ranging device, the differences between each set of detection data and corresponding standard data are significant. Therefore, a standard deviation of differences between each set of detection data and standard data corresponding to the set of detection data may be calculated, and it is determined, based on the standard deviation, whether the light detection process of the first light detection and ranging device is interfered by the second light detection and ranging device. Specifically, if there is detection data where a standard deviation of differences between the detection data and standard data corresponding to the detection data is greater than a preset third threshold, it is indicated that there is one piece or some pieces of detection data which significantly differ from the corresponding standard data. In this case, it can be considered that the significant differences between the detection data and the standard data corresponding to the detection data is caused by the light detection process of the first light detection and ranging device being interfered by the second light detection and ranging device. In addition, only in a case where a standard deviation of differences between each set of detection data and standard data corresponding to the set of detection data is not greater than the preset third threshold, which indicates that differences between each set of detection data and the standard data corresponding to the set of detection data are insignificant, it can be considered that the light detection process of the first light detection and ranging device is not interfered by the light detection process of the second light detection and ranging device.

The preset third threshold may be preset by a technician or may be automatically generated by an algorithm or a program. The preset third threshold may be set in several manners, which are not described herein.

This implementation is described by means of an example for better understanding of the implementation.

It is assumed that a first radar detection and ranging device performs four signal samplings on detection light reflected by an obstacle during the light detection process, and acquires four sets of detection data, where each set of detection data is a detection pixel array. Further, it is assumed for each detection pixel array that the detection pixel array include n pixels $a_1, a_2, \ldots,$ and $a_n$. In this case, differences $\Delta_1, \Delta_2 \ldots$ and $\Delta_n$ between grayscale values of pixels in the detection pixel array and grayscale values of corresponding pixels in a standard pixel array (i.e., standard data) corresponding to the detection pixel array are acquired by subtracting grayscale values of pixels in the detection pixel array from grayscale values of corresponding pixels in the standard pixel array, and a standard deviation of these differences is calculated. Specifically, these differences $\Delta_1$, $\Delta_2, \ldots, \Delta_n$ are summed up to obtain a total difference M, and the total difference M is divided by the number of all pixels in the detection pixel array which is represented by n, to obtain an average value $\bar{u}$ of these differences. Then, a quadratic sum W of differences between grayscale values of all pixels in the detection pixel array and the average value $\bar{u}$ is calculated, then the quadratic sum W is divided by the number of all pixels in the detection pixel array n to obtain a mean $\bar{v}$ of the quadratic sum, and an arithmetic square root of the average value $\bar{v}$ is calculated, thereby acquiring the standard deviation of differences between grayscale values of pixels in the detection pixel array and grayscale values of the corresponding pixels in the standard pixel array corresponding to the detection pixel array. With the above process, a standard deviation of differences between grayscale values of pixels in each of four detection pixel arrays and grayscale values of corresponding pixels in the standard pixel array corresponding to the detection pixel array may be calculated.

In a case where at least one standard deviation is greater than the preset third threshold, it can be determined that the light detection process of the first light detection and ranging device is interfered by the second light detection and ranging device. In addition, in a case where each standard deviation is not greater than the preset third threshold, it can be determined that the light detection process of the first light detection and ranging device is not interfered by the second light detection and ranging device.

Further, since an environment in which the first radar detection and ranging device is located in not constant (for example, the illumination may become stronger or weaker), the standard data may be updated in a real time manner to adapt to the environment change. As an example, the method according the embodiment of the present disclosure may further include the following steps.

In a case where a standard deviation of differences between each detection data and standard data corresponding to the detection data is not greater than the preset third threshold, the first light detection and ranging device determines that the light detection process is not interfered by a second radar detection and ranging device in the ranging system.

The first light detection and ranging device can replace, with the detection data, standard data corresponding to detection data.

Therefore, in order to reduce the impact from the environmental change as much as possible, the standard data may be updated in a case where the standard deviation of differences between each detection data and the standard data corresponding to the detection data is not greater than the preset third threshold. In a case where all standard deviations are not greater than the preset third threshold, it can be determined that the light detection process is not interfered by the second radar detection and ranging device. In this case, the detection data acquired in the current light detection process is a light intensity value acquired when there is no interference. In a case where the standard data corresponding to detection data is replaced with the detection data, the impact from the environmental change can be reduced since an environment in which the first light detection and ranging device is located in a next light detection process is substantially the same as the environment corresponding to the standard data. On contrary, in a case where at least one standard deviation is greater than the preset third threshold, which indicates that the light detection process of the first light detection and ranging device is interfered by the second radar detection and ranging device, detection data acquired in the current light detection process is light intensity values acquired when there is interference. In this case, the standard data is not updated, that is, the standard data corresponding to detection data is not replaced with the detection data with interference.

Figure 7:
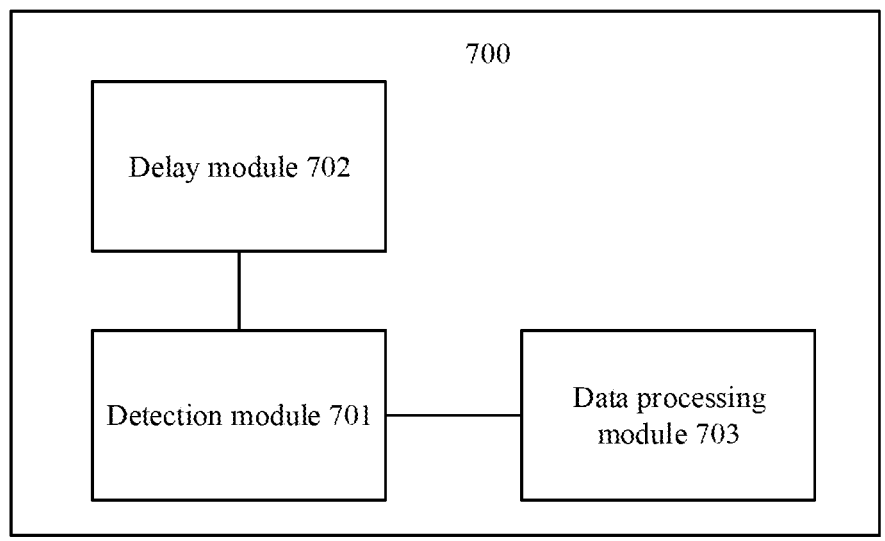
FIG. 7 is a schematic structural diagram of an anti-interference ranging apparatus according to an embodiment of the present disclosure.

In addition, an anti-interference ranging apparatus is provided according to an embodiment of the present disclosure. Reference is made to FIG. 7, which is a schematic structural diagram of an anti-interference ranging apparatus according to an embodiment of the present disclosure. The apparatus 700 is applied to each of light detection and ranging devices in a ranging system, and may include a detection module 701, a delay module 702 and a data processing module 703.

The detection module 701 is configured to detect whether a light detection process of a first light detection and ranging device is interfered by a second light detection and ranging device in the ranging system.

The delay module 702 is configured to delay the light detection process of the first light detection and ranging device for a preset time period if it is detected that the light detection process of the first light detection and ranging device is interfered by the second light detection and ranging device in the ranging system.

The data processing module 703 is configured to process detection data collected in the light detection process by the first light detection and ranging device to obtain a ranging result in a case where it is detected that the light detection process of the first light detection and ranging device is not interfered by the second light detection and ranging device in the ranging system.

In some possible implementations, the detection module 701 may include a capture unit and a detection unit.

The capture unit is configured to capture an environment image for characterizing information on an environment in which the first light detection and ranging device is located.

The detection unit is configured to detect, based on the environment image, whether the light detection process is interfered by the second light detection and ranging device in the ranging system.

In some possible implementations, durations of light detection processes of the light detection and ranging devices in the ranging system are the same, the environment image includes a first environment image for characterizing information on the environment in which the first light detection and ranging device is located at a first time instant before the light detection process, and a second environment image for characterizing information on the environment in which the first light detection and ranging device is located at a second time instant after the light detection process, and the detection unit may include a first acquisition subunit, a second acquisition subunit and a first determination subunit.

The first acquisition subunit is configured to acquire a difference image for characterizing differences between grayscale values of the first environment image and grayscale values of the second environment image based on the first environment image and the second environment image.

The second acquisition subunit is configured to acquire a sum of absolute values of grayscale values of pixels in the difference image.

The first determination subunit is configured to determine that the light detection process is interfered by the second light detection and ranging device in the ranging system in a case where the sum of the absolute values of the grayscale values is greater than a preset first threshold.

In some possible implementations, the environment image characterizes information on the environment before the light detection process, and the detection unit may include a third acquisition subunit and a second determination subunit.

The third acquisition subunit is configured to acquire a gray value gradient of the environment image.

The second determination subunit is configured to determine that the light detection process is interfered by the second light detection and ranging device in the ranging system in a case where the gray value gradient is greater than a preset second threshold.

In some possible embodiments, the detection module 701 may include a calculation unit and a first determination unit.

The calculation unit is configured to calculate a standard deviation of differences between each set of detection data and standard data corresponding to the set of detection data. The standard data corresponding to the set of detection data characterizes light intensity values acquired when there is no interference.

The first determination unit is configured to determine that the light detection process is interfered by the second light detection and ranging device in the ranging system in a case where a standard deviation of differences between at least one set of detection data and standard data corresponding to the set of detection data is greater than a preset third threshold.

In some possible embodiments, the apparatus 700 may further include a determination module and a replacement module.

The determination module is configured to determine that the light detection process is not interfered by the second light detection and ranging device in the ranging system in a case where a standard deviation of differences between each detection data and standard data corresponding to the detection data is not greater than the preset third threshold.

The replacement module is configured to replace, with the detection data, the standard data corresponding to the detection data.

In some possible implementations, the delay module 702 may include a second determination unit and a delay unit.

The second determination unit is configured to determine, based on a time ratio, the preset time period to be N times of the duration of the light detection process, where the time ratio is a ratio of a duration of a data processing process to the duration of the light detection process of the first light detection and ranging device, and N is a positive integer not greater than the time ratio.

The delay unit is configured to cause the first light detection and ranging device to delay the light detection process for the preset time period.

The manners in which the modules of the apparatus according to above embodiment perform operations are described in the above method embodiment, and are not described in detail herein.

Figure 8:
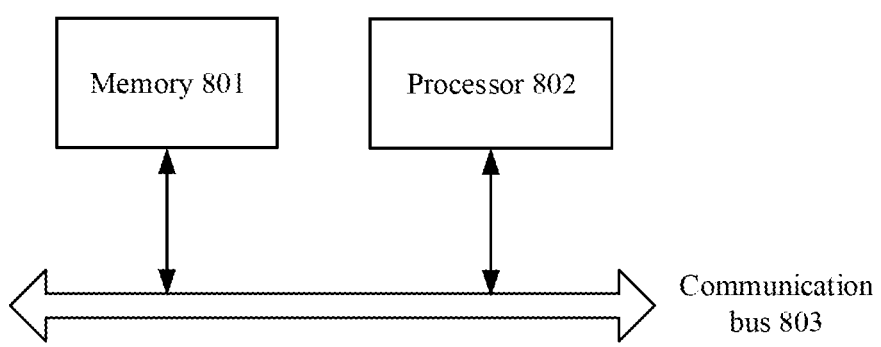
FIG. 8 is a schematic diagram showing a hardware structure of an anti-interference ranging apparatus according to an embodiment of the present disclosure.

An anti-interference ranging hardware device is further provided according to an embodiment of the present disclosure. As shown in FIG. 8, the hardware device includes a memory 801, a processor 802 and a communication bus 803.

The memory 801 exchanges data with the processor 802 via the communication bus 803. The memory 801 is configured to store an instruction, and the processor 802 is configured to call the instruction from the memory 801 and execute the instruction. The instruction, when called by the processor 802, causes the processor 802 to perform the operations of:

detecting, by a first light detection and ranging device, whether a light detection process of the first light detection and ranging device is interfered by a second light detection and ranging device in the ranging system;

delaying, by the first light detection and ranging device, the light detection process for a preset time period if it is detected that the light detection process of the first light detection and ranging device is interfered by the second light detection and ranging device in the ranging system; and acquiring, by the first light detection and ranging device, detection data collected in the light detection process, and processing, by the first light detection and ranging device, the detection data to obtain a ranging result if it is detected that the light detection process of the first light detection and ranging device is not interfered by the second light detection and ranging device in the ranging system.

In some possible implementations, the detecting, by a first light detection and ranging device, whether a light detection process of the first light detection and ranging device is interfered by a second light detection and ranging device in the ranging system may include:

capturing, by a first light detection and ranging device, an environment image for characterizing information on an environment in which the first light detection and ranging device is located; and detecting, by the first light detection and ranging device based on the environment image, whether the light detection process is interfered by the second light detection and ranging device in the ranging system.

In some possible implementations, durations of light detection processes of the light detection and ranging devices in the ranging system are the same, the environment image includes a first environment image for characterizing information on the environment in which the first light detection and ranging device is located at a first time instant before the light detection process, and a second environment image for characterizing information on the environment in which the first light detection and ranging device is located at a second time instant after the light detection process, and the detecting, by the first light detection and ranging device based on the environment image, whether the light detection process is interfered by the second light detection and ranging device in the ranging system may include:

acquiring, by the first light detection and ranging device based on the first environment image and the second environment image, a difference image for characterizing differences between grayscale values of the first environment image and grayscale values of the second environment image;

acquiring, by the first light detection and ranging device, a sum of absolute values of grayscale values of pixels in the difference image; and determining, by the first light detection and ranging device, that the light detection process is interfered by the second light detection and ranging device in the ranging system in a case where the sum of the absolute values of the grayscale values is greater than a preset first threshold.

In some possible implementations, the environment image characterizes information on the environment before the light detection process, and the detecting, by the first light detection and ranging device based on the environment image, whether the light detection process is interfered by the second light detection and ranging device in the ranging system may include:

acquiring, by the first light detection and ranging device, a gray value gradient of the environment image; and determining, by the first light detection and ranging device, that the light detection process is interfered by the second light detection and ranging device in the ranging system in a case where the gray value gradient is greater than a preset second threshold.

In some possible implementations, the detecting, by the first light detection and ranging device, whether the light detection process of the first light detection and ranging device is interfered by the second light detection and ranging device in the ranging system may include:

calculating, by the first light detection and ranging device, a standard deviation of differences between each set of detection data and standard data corresponding to the set of detection data, wherein the standard data corresponding to the set of detection data characterizes light intensity values acquired when there is no interference; and determining, by the first light detection and ranging device, that the light detection process is interfered by the second light detection and ranging device in the ranging system in a case where a standard deviation of differences between at least one set of detection data and standard data corresponding to the set of detection data is greater than a preset third threshold.

In some possible implementations, the instruction, when called by the processor 802, further causes the processor 802 to perform the operations of:

determining, by the first light detection and ranging device, that the light detection process is not interfered by the second light detection and ranging device in the ranging system in a case where a standard deviation of differences between each detection data and standard data corresponding to the detection data is not greater than the preset third threshold; and replacing, by the first light detection and ranging device with the detection data, the standard data corresponding to the detection data.

In some possible embodiments, the delaying, by the first light detection and ranging device, the light detection process for a preset time period may include:

determining, by the first light detection and ranging device based on a time ratio, the preset time period to be N times of the duration of the light detection process, where the time ratio is a ratio of a duration of a data processing process to the duration of the light detection process of the first light detection and ranging device, and N is a positive integer not greater than the time ratio; and delaying, by the first light detection and ranging device, the light detection process for the preset time period.

In addition, a non-temporary computer readable storage medium including an instruction such as a memory including an instruction is further provided according to the present disclosure. The instruction may be performed by a processor to implement the method shown in FIG. 4. For example, the non-temporary computer readable storage medium may be a ROM, a random access memory (RAM), a CD-ROM, a magnetic tape, a floppy disk, an optical data storage device and the like.

There is provided a non-temporary computer readable storage medium storing an instruction that, when performed by a processor in a mobile terminal, causes the mobile terminal to perform an anti-interference ranging method. The method may include:

detecting, by a first light detection and ranging device, whether a light detection process of the first light detection and ranging device is interfered by a second light detection and ranging device in the ranging system, where the ranging system includes at least the first light detection and ranging device and the second light detection and ranging device;

delaying, by the first light detection and ranging device, the light detection process for a preset time period if it is detected that the light detection process of the first light detection and ranging device is interfered by the second light detection and ranging device in the ranging system; and acquiring, by the first light detection and ranging device, detection data collected in the light detection process, and processing, by the first light detection and ranging device, the detection data to obtain a ranging result if it is detected that the light detection process of the first light detection and ranging device is not interfered by the second light detection and ranging device in the ranging system.

Other implementations of the present disclosure may be obtained by those skilled in the art after considering the specification and practicing the present disclosure. The present disclosure is intended to encompass any variations, applications or adaptive changes, which comply with general principles of the present disclosure and include common knowledge or customary technical means in the art that are not disclosed in the present disclosure. The specification and the embodiments are only considered to be exemplary, and the true scope and spirit of the present disclosure shall be indicated by the following claims.

It should be understood that, the present disclosure is not limited to specific structures described above and shown in the drawings, and can be modified and changed without departing from the spirit of the present disclosure. The scope of the present disclosure is limited only by the appended claims.

The foregoing is merely a preferred embodiment of the present disclosure and is not intended to limit the present disclosure, and any modifications, equivalent substitutions and improvements within the spirit and the principle of the present disclosure are included within the protection scope of the present disclosure.

The invention claimed is:

1. An anti-interference ranging method, wherein the method is applied to each of light detection and ranging devices in a ranging system, and comprises:

detecting, by a first light detection and ranging device, whether a light detection process of the first light detection and ranging device is interfered by a second light detection and ranging device in the ranging system;

delaying, by the first light detection and ranging device, the light detection process for a preset time period if it is detected that the light detection process of the first light detection and ranging device is interfered by the second light detection and ranging device in the ranging system; and acquiring, by the first light detection and ranging device, detection data collected in the light detection process, and processing, by the first light detection and ranging device, the detection data to obtain a ranging result if it is detected that the light detection process of the first light detection and ranging device is not interfered by the second light detection and ranging device in the ranging system, wherein the delaying, by the first light detection and ranging device, the light detection process for a preset time period comprises:

determining, by the first light detection and ranging device based on a time ratio, the preset time period to be N times of a duration of the light detection process, wherein the time ratio is a ratio of a duration of a data processing process to the duration of the light detection process of the first light detection and ranging device, and N is a positive integer not greater than the time ratio; and delaying, by the first light detection and ranging device, the light detection process for the preset time period.

2. The method according to claim 1, wherein the detecting, by the first light detection and ranging device, whether the light detection process of the first light detection and ranging device is interfered by the second light detection and ranging device in the ranging system comprises:

capturing, by the first light detection and ranging device, an environment image for characterizing information on an environment in which the first light detection and ranging device is located; and detecting, by the first light detection and ranging device based on the environment image, whether the light detection process is interfered by the second light detection and ranging device in the ranging system.

3. The method according to claim 2, wherein durations of light detection processes of the light detection and ranging devices in the ranging system are the same, the environment image comprises a first environment image for characterizing information on the environment in which the first light detection and ranging device is located at a first time instant before the light detection process, and a second environment image for characterizing information on the environment in which the first light detection and ranging device is located at a second time instant after the light detection process, and the detecting, by the first light detection and ranging device based on the environment image, whether the light detection process is interfered by the second light detection and ranging device in the ranging system comprises:

acquiring, by the first light detection and ranging device based on the first environment image and the second environment image, a difference image for characterizing differences between grayscale values of the first environment image and grayscale values of the second environment image;

acquiring, by the first light detection and ranging device, a sum of absolute values of grayscale values of pixels in the difference image; and determining, by the first light detection and ranging device, that the light detection process is interfered by the second light detection and ranging device in the ranging system in a case where the sum of the absolute values of the grayscale values is greater than a preset first threshold.

4. The method according to claim 2, wherein the environment image characterizes information on the environment before the light detection process, and the detecting, by the first light detection and ranging device based on the environment image, whether the light detection process is interfered by the second light detection and ranging device in the ranging system comprises:

acquiring, by the first light detection and ranging device, a gray value gradient of the environment image; and determining, by the first light detection and ranging device, that the light detection process is interfered by the second light detection and ranging device in the ranging system in a case where the gray value gradient is greater than a preset second threshold.

5. The method according to claim 1, wherein the detecting, by the first light detection and ranging device, whether the light detection process of the first light detection and ranging device is interfered by the second light detection and ranging device in the ranging system comprises:

calculating, by the first light detection and ranging device, a standard deviation of differences between each set of detection data and standard data corresponding to the set of detection data, wherein the standard data corresponding to the set of detection data characterizes light intensity values acquired when there is no interference; and determining, by the first light detection and ranging device, that the light detection process is interfered by the second light detection and ranging device in the ranging system in a case where a standard deviation of differences between at least one set of detection data and standard data corresponding to the set of detection data is greater than a preset third threshold.

6. The method according to claim 5, further comprising:

determining, by the first light detection and ranging device, that the light detection process is not interfered by the second light detection and ranging device in the ranging system in a case where a standard deviation of differences between each detection data and standard data corresponding to the detection data is not greater than the preset third threshold; and replacing, by the first light detection and ranging device with the detection data, the standard data corresponding to the detection data.

7. An anti-interference ranging apparatus, wherein the apparatus is applied to each of light detection and ranging devices in a ranging system, and comprises:

a detection module configured to detect whether a light detection process of a first light detection and ranging device is interfered by a second light detection and ranging device in the ranging system;

a delay module configured to delay the light detection process of the first light detection and ranging device for a preset time period if it is detected that the light detection process of the first light detection and ranging device is interfered by the second light detection and ranging device in the ranging system; and a data processing module configured to process detection data collected in the light detection process by the first light detection and ranging device to obtain a ranging result if it is detected that the light detection process of the first light detection and ranging device is not interfered by the second light detection and ranging device in the ranging system, wherein the delay module comprises:

a second determination unit configured to determine, based on a time ratio, the preset time period to be N times of a duration of the light detection process, wherein the time ratio is a ratio of a duration of a data processing process to the duration of the light detection process of the first light detection and ranging device, and N is a positive integer not greater than the time ratio; and a delay unit configured to cause the first light detection and ranging device to delay the light detection process for the preset time period.

8. The apparatus according to claim 7, wherein the detection module comprises:
- a capture unit configured to capture an environment image for characterizing information on an environment in which the first light detection and ranging device is located; and
- a detection unit configured to detect, based on the environment image, whether the light detection process is interfered by the second light detection and ranging device in the ranging system.

9. The apparatus according to claim 8, wherein
durations of light detection processes of the light detection and ranging devices in the ranging system are the same,
the environment image comprises a first environment image for characterizing information on the environment in which the first light detection and ranging device is located at a first time instant before the light detection process, and a second environment image for characterizing information on the environment in which the first light detection and ranging device is located at a second time instant after the light detection process, and
the detection unit comprises:
- a first acquisition subunit configured to acquire, based on the first environment image and the second environment image, a difference image for characterizing differences between grayscale values of the first environment image and grayscale values of the second environment image;
- a second acquisition subunit configured to acquire a sum of absolute values of grayscale values of pixels in the difference image; and
- a first determination subunit configured to determine that the light detection process is interfered by the second light detection and ranging device in the ranging system in a case where the sum of the absolute values of the grayscale values is greater than a preset first threshold.

10. The apparatus according to claim 8, wherein
the environment image characterizes information on the environment before the light detection process, and
the detection unit comprises:
- a third acquisition sub-unit configured to acquiring a gray value gradient of the environment image; and
- a second determination sub-unit configured to determine that the light detection process is interfered by the second light detection and ranging device in the ranging system in a case where the gray value gradient is greater than a preset second threshold.

11. The apparatus according to claim 7, wherein the detection unit comprises:
- a calculation unit configured to calculate a standard deviation of differences between each set of detection data and standard data corresponding to the set of detection data, wherein the standard data corresponding to the set of detection data characterizes light intensity values acquired when there is no interference; and
- a first determination unit configured to determine that the light detection process is interfered by the second light detection and ranging device in the ranging system in a case where a standard deviation of differences between at least one set of detection data and standard data corresponding to the set of detection data is greater than a preset third threshold.

12. The apparatus according to claim 11, further comprising:
- a determination module configured to determine that the light detection process is not interfered by the second light detection and ranging device in the ranging system in a case where a standard deviation of differences between each detection data and standard data corresponding to the detection data is not greater than the preset third threshold; and
- a replacement module configured to replace, with the detection data, the standard data corresponding to the detection data.

* * * * *